Patented July 3, 1928.

1,676,082

UNITED STATES PATENT OFFICE.

RALPH ETTLINGER, OF KANSAS CITY, MISSOURI.

SAUSAGE CASING.

No Drawing.   Application filed December 5, 1927.  Serial No. 237,991.

This invention relates to improvements in sausage casings and refers more particularly to a substitute for the animal tissues such as beef bladders now used for this purpose, artificially made casings consisting of cotton or other textile fabrics treated with a sealing material as hereafter described.

A material or casing of the sort described for the purpose of packing sausages must be practically air tight, insoluble in water, or insoluble to the extent that it does not soften excessively, pliable when subject to warm or desiccating conditions, and capable of allowing the passage of wood creosote flavors during the normal smoking process for the sausage contained in the casings. Another purpose of the invention is to provide a preserving agent for the sausage to which, however, in the normal operation of the process, no chemical preservative has been added, the preserving action being due to the exclusion of air and to such effect as may be had in the ordinary treatment of meat by smoking. While there are several divergent means of applying the process, the following is representative:

Eight gallons of water are added to twenty-five pounds of uncured hogskins or hog hides. This mixture is boiled down so that the solution weighs fifteen pounds and to this concentrated solution are added about five ounces of glycerine, one and one-half pounds of salt and coloring matter sufficient to give the desired tint when a colored product is desired. This solution is then used to thoroughly coat one side of cheesecloth, calendered muslin, or other suitable cloth. The amount used is such that the increase in the weight of the cloth is from four to six ounces for one yard. The cloth is then subjected to wood smoke in a smokehouse, normally for a period of twenty-four hours, or for such period as is sufficient to properly dry and harden the solution and render it practically insoluble in water but yet pervious to the fumes from the smokehouse. It is desirable that the cloth should not be penetrated excessively, but merely that a coating should be formed on the surface. It is therefore necessary that the solution have a considerable viscosity and preferable that the solution should be applied hot, so that the gelatinous substance in the solution should set to a considerable extent from cooling alone. The main agent in the solution is gelatine or gelatine-like substances of animal or vegetable origin. Such materials as gelatinous extracts are made by dissolving hides or offal of any kind also gelatinous vegetable matter such as agar-agar, gelatinous sea weeds and the like. The purpose of the glycerine is to keep the treated cloth in a pliable condition. The salt is added for seasoning and preservative purposes and aids in allowing the penetration of the flavoring and preservative vapors from the smoke. The action of the smoke is not only to give flavor, to sterilize and give preservative qualities to the cloth, but also to harden or set the gelatinous materials in the extract from the hogskins. This hardening or precipitating action is due, possibly, to the presence of aldehyde-like substances in the smoke.

The cloth can be made as above by a continuous process, the operation being carried on by first calendering it, treating it, drying it, and smoking it, in proper sequence. Or it may be carried out in part or wholly intermittently. Gelatinous extracts from animal or vegetable sources may also be used, the above material being representative of many sources of inexpensive materials suitable for my purpose. Treatment may also be effected by coating the cloth with highly viscous or concentrated skimmed milk, the active principle of which is casein.

After the cloth has been prepared for the manufacture of casings they are ordinarily sewed into about four or five sizes of sacks. These sizes are as follows:

12 x 19 inch size, which is used in place of the large beef bladders.

9 x 19 inch size, used in place of the medium beef bladders.

5½ x 24 inch size, used in place of the medium beef bung and weazand.

7 x 24 inch size, used in place of the large beef bung.

4½ x 24 inch size, used in place of beef middles.

Under typical market conditions it has been found that the cost of manufacture of such casings in place of the natural animal casings heretofore used, is about one-half less.

After these sacks or casing bags are made and before filling, they are soaked with water and then filled with the ground meat, closed and subjected to smoking again. The purpose of the smoking is to give the proper flavor and preservative qualities to the sausage and therefore it is necessary that the smoke penetrate the casings as freely as the natural casings ordinarily used. As an alternative treatment it is sometimes desirable to first fill the casings with meat and then dip them into the treating solution, after which they are smoked in the usual manner. This alternative method allows the completion of the treatment in one smoking process.

I claim as my invention:

1. A process of treating fabric suitable for the manufacture of sausage casings which consists in coating it on one side with a substance containing gelatinized raw hogskins and then subjecting the fabric to the drying, setting and preservative action of wood smoke.

2. A process of treating fabric suitable for the manufacture of sausage casings which consists in coating one side with a water soluton of raw hogskins and then subjecting the fabric to the drying, setting and preservative action of wood smoke.

3. A process of treating fabric to render it suitable for sausage casings, which comprises the steps of coating the outer surface with a water solution of raw hogskins and subjecting the fabric to the desiccating, flavoring and preserving action of wood smoke.

4. A process of manufacturing sausage casings, comprising the steps of covering the outer surface of a fabric bag with a water soluton of raw hogskins containing a percentage of gelatin and smoking the treated cloth.

5. A process of manufacturing sausage casings, comprising the steps of covering the outer surface with a gelatinous solution of raw hogskins, said solution containing an addition of glycerine and salt, and subjecting the casings to the desiccating, flavoring and preserving action of wood smoke.

RALPH ETTLINGER.